No. 671,575. Patented Apr. 9, 1901.
W. J. WOOSLEY.
MOTOR CARRIAGE.
(Application filed Aug. 11, 1900.)
(No Model.) 3 Sheets—Sheet 1.
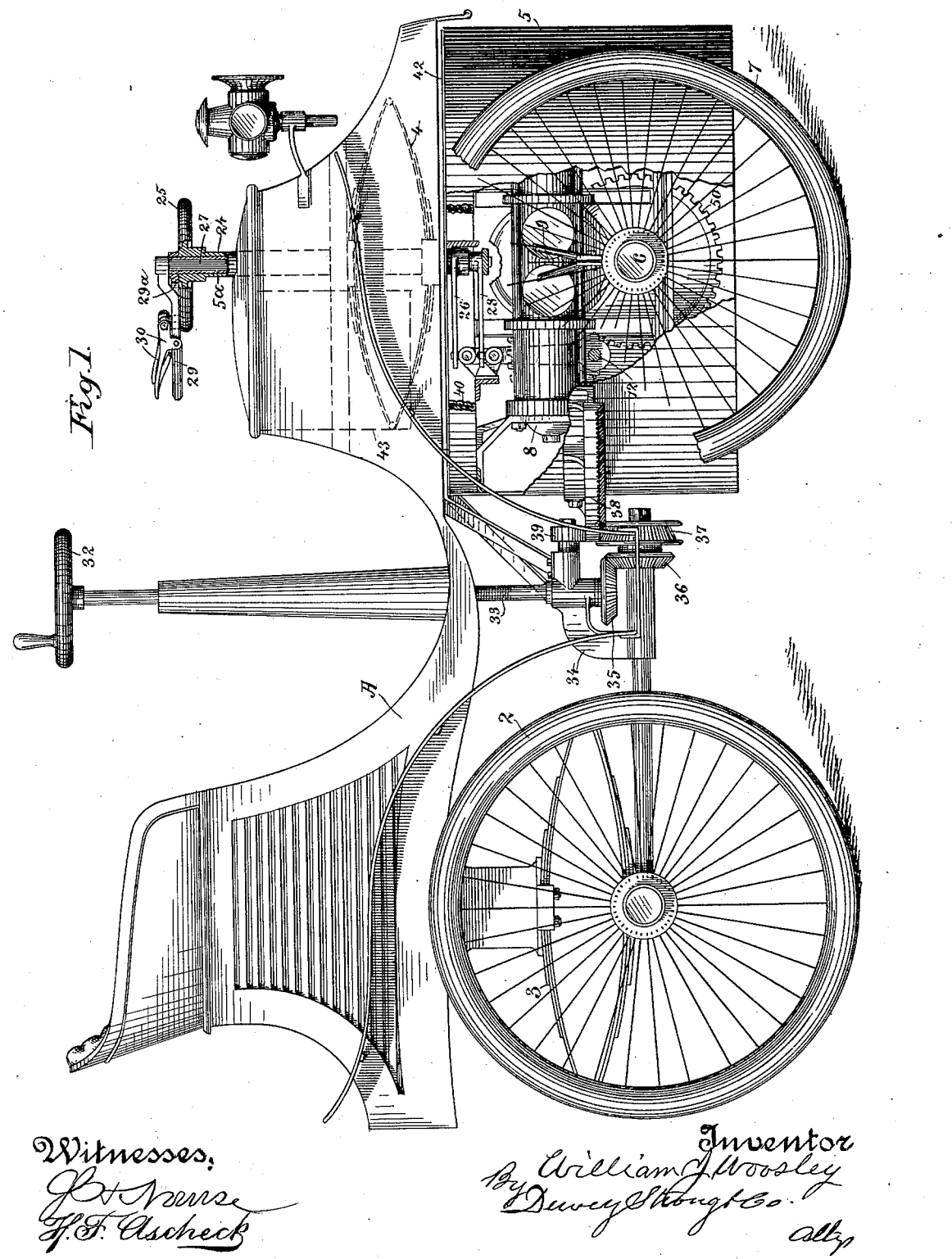
Witnesses:
Inventor
William J. Woosley
By Dewey Strong & Co.
Atty.

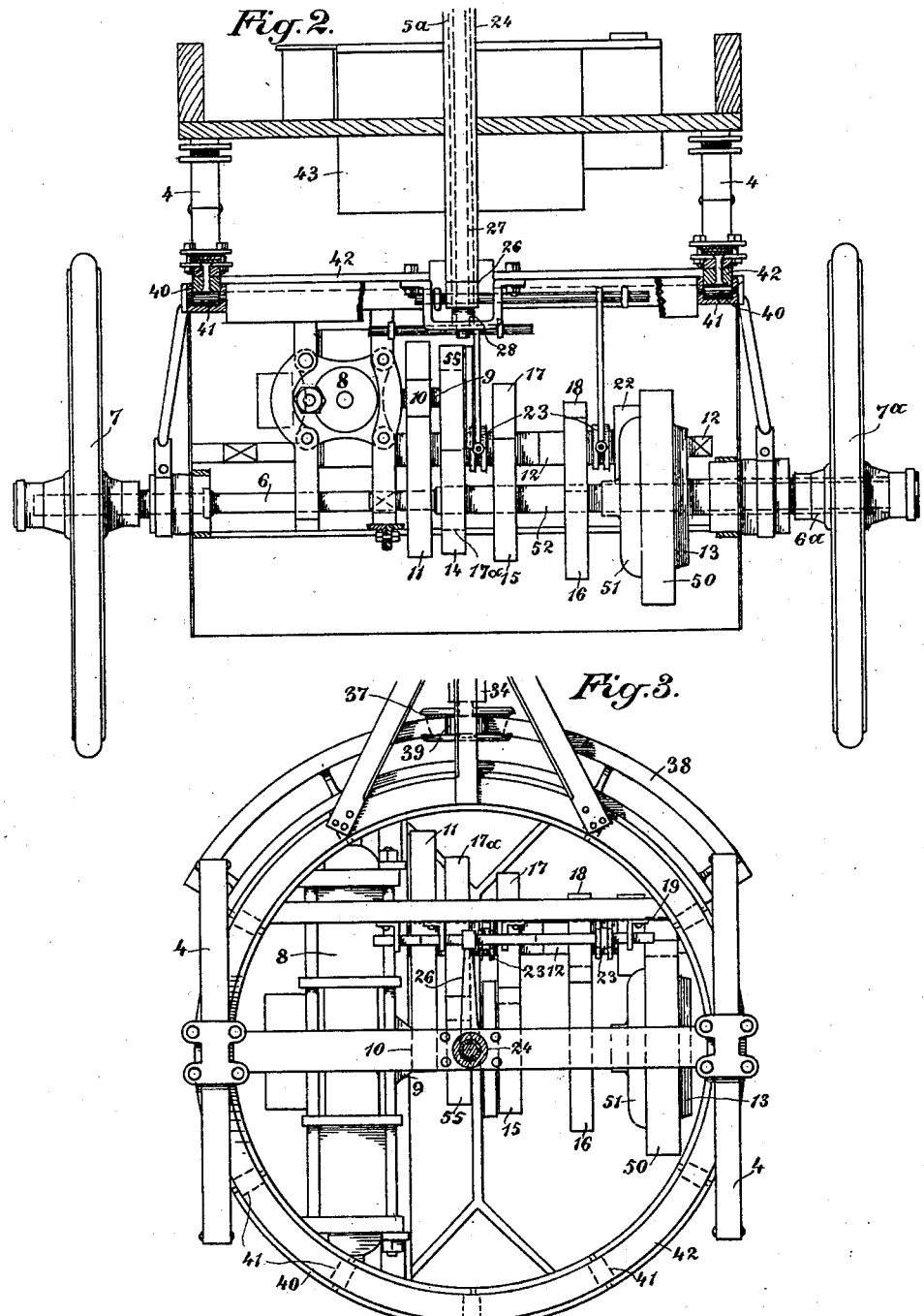

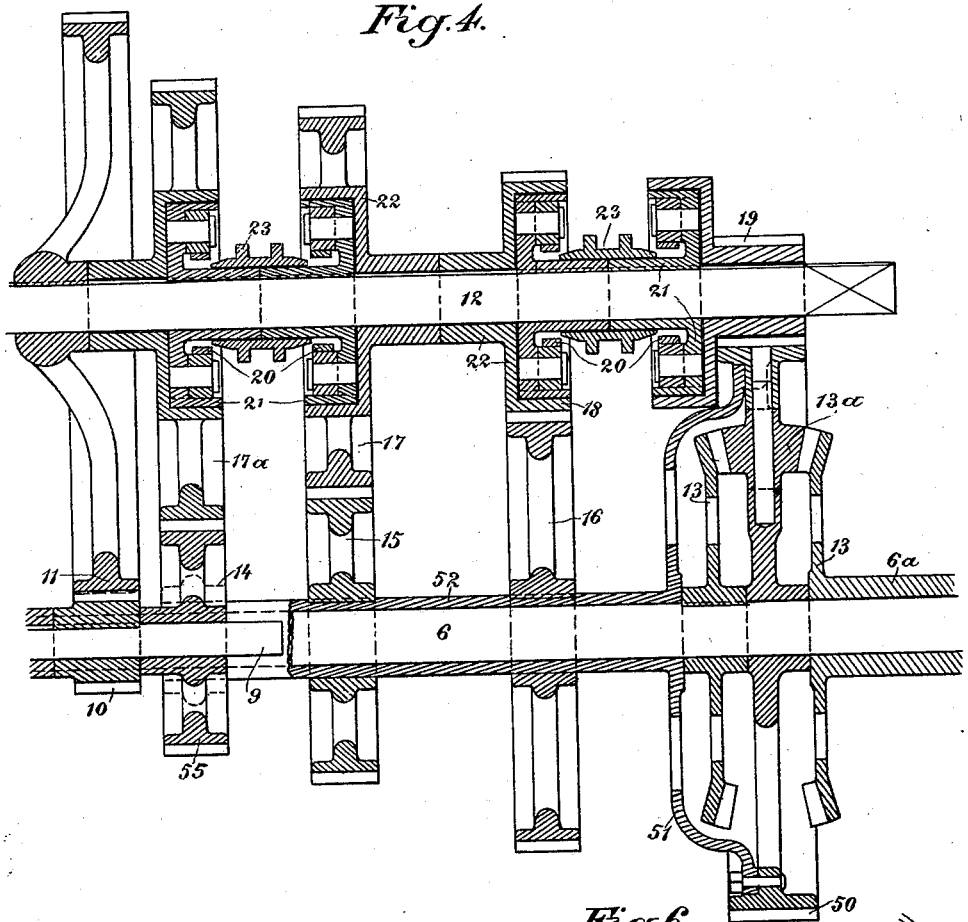
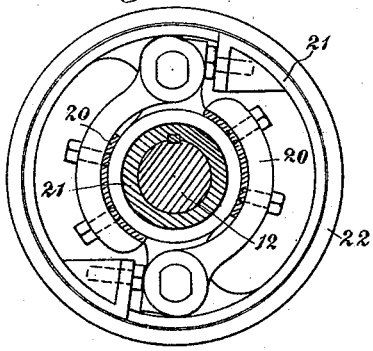
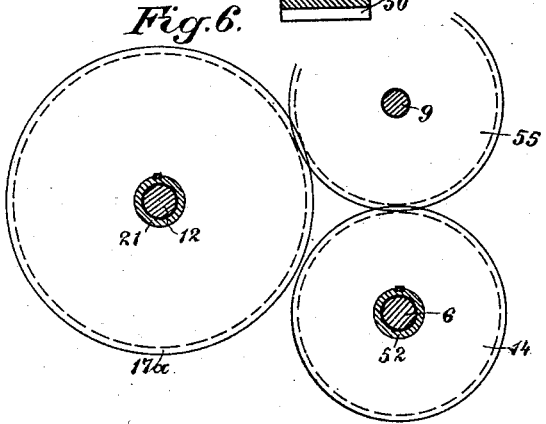

UNITED STATES PATENT OFFICE.

WILLIAM J. WOOSLEY, OF SAN FRANCISCO, CALIFORNIA.

MOTOR-CARRIAGE.

SPECIFICATION forming part of Letters Patent No. 671,575, dated April 9, 1901.

Application filed August 11, 1900. Serial No. 26,599. (No model.)

*To all whom it may concern:*

Be it known that I, WILLIAM J. WOOSLEY, a citizen of the United States, residing in the city and county of San Francisco, State of California, have invented an improvement in Motor-Carriages; and I hereby declare the following to be a full, clear, and exact description of the same.

My invention relates to motor-carriages, and has for its object improvements in the construction of the vehicle; and it consists in the mounting of the motor, the intermediate and variable driving-gears through which motion is transmitted therefrom, the connection of the vehicle with the motor, intermediate guide mechanism by which the part containing the motor and associated mechanism is turnable in unison with the movements of the wheel-axle with relation to the vehicle-body, means for applying power to turn these parts to steer the vehicle, means for transmitting power directly to the front axle of the vehicle, and means for changing the speed and reversing the mechanism, which also acts as brake. It also comprises details of construction which will be more fully explained by reference to the accompanying drawings, in which—

Figure 1 is a side elevation with part of front wheel and casing broken away. Fig. 2 is a vertical transverse section of the fore-body and casing. Fig. 3 is a plan view of same. Fig. 4 is a sectional view of the gearing and clutches. Fig. 5 is an interior view of a clutch transverse to the shaft. Fig. 6 shows the reversing-gear, which also acts as brake.

A is the body of the vehicle, which may be of any usual or suitable form and any desired ornamentation. The rear portion of the body is supported upon the axles of the rear wheels 2, with intervening springs 3 or without, as desired. The front portion of the body is suitably shaped and supported upon springs 4, and the mechanism for driving the vehicle is inclosed within a casing 5, upon the frame of which the springs 4 are supported. The casing and supports for the mechanism are carried directly upon the shaft or axle 6 of the front wheels 7 of the vehicle, and the movements of these parts are all in unison with the movements of this axle, while the springs intermediate between these parts and the vehicle provide for the easy riding of the latter without in any way interfering with it or affecting the connections between the motor and the axle or shaft to be driven.

The engine 8 may be of any usual or suitable construction and of a size which can be contained within the casing 5.

The engine-shaft 9 is journaled in suitable boxes, and it carries upon it a pinion 10, which engages with the gear-wheel 11, mounted upon a counter-shaft 12, which is also supported in boxes within the casing 5 and motion is transmitted through the pinion and gear above mentioned to drive the shaft 12.

One of the bearing and driving wheels 7 is keyed or fixed to the axle 6, and the other one $7^a$ is carried by a sleeve $6^a$, loosely turnable upon the axle, by means of a differential gear of any well-known construction. The form which is here shown comprises bevel-gear disks 13, one of which is keyed to the axle 6 and the other to the sleeve upon which the wheel $7^a$ is mounted. Bevel-pinions $13^a$ turn loosely upon radial shafts carried by the rim, through which power is transmitted to revolve them and the gears 13 with which they mesh, and through them the bearing-wheels 7 $7^a$. Fixed to the rim 50 is a bell or cup-shaped flange 51, having a sleeve 52, which fits and is loosely turnable upon the axle 6. This sleeve carries the gears 14, 15, and 16, of which there are as many as may be desired for different speeds. The bell-flange 51, sleeve 52, and the gears 14, 15, and 16 all turn in unison whatever may be the speed which is transmitted to drive the machine. These gears intermesh with gears 17, 18, and 19, which are loosely mounted upon the counter-shaft 12 and maintain a continuous engagement with the gears 14, 15, and 16; but intermediate between the gears 17, 18, and 19 and the shaft 12, upon which they are carried, are mechanisms by which either of these gears may be temporarily rigidly connected with the shaft, so that power may be transmitted through this gear to its fellow with which it engages upon the sleeve 52, and while power is transmitted through this train of gears the other ones upon the sleeve turning in unison with it will transmit motion at various rates of speed to the corresponding intermeshing gears upon the counter-shaft; but since these gears are not at such times engaged, but are allowed to turn freely, the motion thus transmitted does not pass beyond the gears themselves, so that they may run at the various rates of speed caused by the difference in their diameters and the diameters of the gears upon the axles with which they intermesh. The motion thus transmitted to the sleeve 52 and the bell-flange 51 passes through the rim 50 and the differential gear to the bearing-wheels 7 7$^a$. The smallest gear 19 upon the counter-shaft 12 engages the toothed periphery of the rim 50, turning in unison with it. By this construction I am enabled to maintain the gears at all times in mesh to avoid any difficulty of throwing one out and another into gear and any danger of breakage caused by the sudden engagement of such gears running at a high or low rate of speed. As they are all always in mesh, it is only necessary to disengage one of the drivers from the counter-shaft and to engage another to change the rate of speed without disengaging the intermeshing teeth of any of the gears.

The means for engaging or disengaging either of the gears 17, 18, or 19 with the shaft 12 consists of levers 20, fulcrumed in a cup-shaped containing-casing 21, carried upon the counter-shaft 12 and itself fitting within the concaved hub 22 of the gear-wheel. Between the pairs of gears, as 18 and 19, is a clutch-ring 23, which is slidable with relation to the shaft 12, intermediate between these gears. Each end of this ring is made conical, as shown, and when the ring is forced to one side by a suitably-constructed clutch-lever it engages with the fulcrumed lever 20 at that side, and, acting through this and the parts 21 and 22, it produces such a frictional contact that the gear-wheel thus acted upon will become fixed and revoluble with the counter-shaft 12, and will thus transmit motion to the gear upon the sleeve 52, with which it intermeshes. The other gears upon the counter-shaft being freely movable with relation to the shaft receive an independent motion at varying rates of speed from the gears upon the sleeve, with which they intermesh. Thus all the gears are in motion, while only one pair is transmitting power. By a suitable mechanism the clutch-members, as at 23, are actuated. As this apparatus is all mounted and turnable with relation to the vehicle-body, as previously stated, the clutch-actuating mechanism must also be centrally disposed with relation to these parts. As here shown, there is a central hollow sleeve 24, having a hand-wheel 25 fixed upon its upper end, and this sleeve extends downwardly into the center of the top of the casing 5. It is supported and turnable about a hollow shaft 5$^a$, which it surrounds, as shown, and upon the lower end it carries a lever-arm 26, which engages and operates one of the clutches 23. Within the hollow supporting-shaft a stem 27 extends downwardly and has upon its lower end a lever-arm 28, similar to that shown at 26, and this engages another of the clutch members 23, and thus controls another set of driving-gears, intermediate between which the clutch member is movable. Upon the upper end of this shaft 27 is a lever 29, extending outwardly above the hand-wheel 25. The rim of the hand-wheel 25 has teeth or notches, and these are engaged by a pin or latch carried upon a spring-pressed lever 30, which is supported upon some part of the apparatus, so that whenever any one gear is engaged to transmit power it may be locked to remain in this condition as long as desired. The lever 29$^a$ is correspondingly locked, so that if a set of gears controlled by this lever are not in use the engaging clutch will be held centrally between the gears, and they will be allowed to rotate freely at any rate of speed which may be transmitted to them. When the other driving-gear is thrown out of action, one of the gears controlled by this lever will be thrown into engagement in a similar manner.

In order to steer the vehicle, I have shown a hand or crank wheel 32, fixed upon a vertical shaft 33, which extends up through the floor of the vehicle in suitable relation with the seat and is properly journaled or supported. Beneath the floor of the vehicle is a yoke or bracket 34, suitably fixed, and through this yoke or bracket the shaft 33 passes and has fixed upon its lower end a bevel-gear 35. This engages with a bevel-gear 36, mounted upon a short horizontal shaft exterior to the casing 5. Upon the same shaft with the bevel-pinion 36 is a beveled toothed wheel 37, which is turned in unison with the bevel-gears, and its teeth engage with the teeth of a curved rack 38, which is secured to the casing 5. In order to maintain the pinion 37 and the curved rack 38 in constant mesh and prevent their getting out of alinement, I have shown the pinion 37 as provided with disks or flanges on each side, so that the teeth of the pinion are really in the bottom of a shallow channel, and the segmental rack enters this channel. Above the rack is a roller 39, journaled so as to press constantly upon the top of the rack, and thus maintain it in mesh with the gear. It will thus be seen that a turn upon the hand or crank wheel 32 in either direction will act through this gear to rotate the casing containing the motor mechanism and with it the wheel-axle upon which this casing and mechanism are rigidly mounted. The steering thus acts upon all the united parts of the driving mechanism as well as upon the wheels through which power is applied.

In order to permit the turning of the casing and mechanism contained therein and the wheels upon which they are mounted for the purpose of steering the machine, it is desirable to have some connection between these movable parts and the carriage-body with relation to which they are turnable. This consists of a channeled ring 40, fixed to and carried by the upper part of the casing 5 and having within it at suitable intervals journaled rollers 41. Upon the front of the vehicle-frame is a ring 42, which is fitted into the circular channel-ring 40 and rests upon the rollers 41 of said part. The vehicle-springs 4 are carried and supported upon the upper ring 42 and maintain their position in unison with this ring, while the parts below are turned in steering, as before described.

The tank for gasolene or other motor is shown at 43, and the battery, the induction-coil, or other igniting device is carried with it and all on the front part of the vehicle and in connection with the horizontally-movable engine and gearing.

The reversing mechanism consists of the gear-wheel 17$^a$, turnable loosely upon the shaft 12 and having a clutch like those previously described to engage or disengage it. Through an idler 55 motion is communicated to a gear 14 upon the shaft or axle 6 to drive the machine in the reverse direction. With three different forward speeds and the reverse, as here shown, two clutches 23 may be employed, one to engage either the reverse or one forward gear and the other interposed between the other two forward gears. This reversing mechanism serves also as a brake to check the speed of the machine, if desired, by acting against the forward movement of the machine.

While I have described and shown my devices and transmitting mechanism in the form of gears, it will be understood that sprocket-wheels and chains or other well-known forms may be substituted therefor without changing the essential features of the invention, which operate similarly, whatever may be the intermediate connections.

Having thus described my invention, what I claim as new, and desire to secure by Letters Patent, is—

1. The combination with a vehicle of a motor, a casing therefor, means for transmitting motion therefrom to the front axle of the vehicle, and including a sleeve freely turnable with relation to the front axle, having drivers of different diameter revoluble in unison with it, a counter-shaft having driving devices loose thereon and in continuous engagement with the drivers on the sleeve, and means for locking either of the said driving devices to the counter-shaft, supports by which said mechanism is united to have a common movement with said axle and without intermediate springs.

2. The combination with a vehicle of a motor, gearing intermediate between said motor and the front axle of the vehicle, supports including a channeled ring on the motor-casing and a ring on the vehicle-body and fitting the channel of the first-named ring by which these parts are mounted so as to move in unison, and means intermediate between the front of the vehicle-body and its springs by which the body is supported, and has a movement independent of that of the driving mechanism.

3. The combination in a vehicle of a body, wheels upon which the rear portion of said body is carried, other wheels beneath the front portion of the body, a motor and mechanism intermediate between it and the front axle whereby motion is transmitted to drive said axle and the wheels carried thereby said mechanism including a sleeve freely turnable with relation to the front axle, having drivers of different diameter revoluble in unison with it, a counter-shaft driven by the motor and driving devices loose thereon and in continuous engagement with the drivers on the sleeve, and means for locking either of the said driving devices to the counter-shaft, and springs intermediate between the casing of said mechanism and the front portion of the vehicle.

4. A vehicle having wheels upon which the rear portion is carried, other wheels beneath the front portion, a motor and transmitting mechanism by which the front wheels are driven, said mechanism including a sleeve freely turnable with relation to the axle and having drivers of different diameter revoluble in unison with it, a counter-shaft having gears loosely mounted and in continuous engagement with said drivers and means for connecting either of the loose gears with the counter-shaft, and said motor being carried upon the front axle, intermediate supports between the motor-casing and the body of the vehicle, and a steering mechanism whereby the front axle and motor are turnable with relation to the vehicle-body.

5. A vehicle having wheels by which the rear portion of the body is supported, other wheels beneath the front portion of the body having a motor and mechanism connecting it with the front axle and carried thereby, said mechanism including a sleeve freely turnable with relation to the axle and having drivers of different diameter revoluble in unison with it, a counter-shaft having gears loosely mounted and in continuous engagement with said drivers, and means for connecting either of the loose gears with the counter-shaft, springs or equivalent supports interposed between the casing of said mechanism, and the front part of the vehicle-body, a curved rack fitting around the casing, a gear engaging the rack, a revoluble steering-shaft, a means for turning it and gears intermediate of said shaft and the rack upon the casing whereby the driving mechanism and front wheels are turnable with relation to the vehicle-body.

6. In a vehicle, a motor carried upon the front axle thereof and turnable from side to side in unison therewith, a counter-shaft, gears by which motion is transmitted from the engine to said counter-shaft, gears loosely carried upon said shaft, and expansion-clutches by which either of said gears may be connected to revolve in unison with the shaft, a second series of gears of different diameter turnable with relation to the wheel-axle and in continuous engagement with the first-named gears, and a means connecting the gears of the second series all of said gears remaining in mesh while only one pair is acting to drive the apparatus.

7. The combination in a vehicle of a motor, a pinion carried upon the shaft thereof, a counter-shaft and a gear fixed thereto and in engagement with the pinion, a front-wheel axle, a sleeve revoluble thereon having a series of gears of different diameter fixed to and revoluble with it, other gears loosely turnable on the counter-shaft, and in continual engagement with the first-named series, and clutch mechanisms whereby either of said counter-shaft gears may be connected therewith to transmit power to the wheel-axle, while the others remain out of action, but in continual mesh with their corresponding gears upon the sleeve.

8. The combination with a motor and its shaft, of an axle, a sleeve freely turnable with relation thereto, having drivers of different diameter revoluble in unison with it, a counter-shaft driven by the motor and interposed between the motor and the sleeve, gears loosely mounted thereon and in continuous engagement with those upon the sleeve, and clutches carried by the counter-shaft and movable to lock either of the loose gears thereto.

9. The combination with a motor and its shaft of an axle and independently-turnable bearing-wheels, a differential gear through which motion is transmitted to drive said wheels, a sleeve connected and turnable with the differential gear and loose upon the axle, gears fixed to and turnable in unison with the sleeve, a counter-shaft to which motion is transmitted from the motor, independently-turnable gears carried by said shaft and in engagement with those upon the sleeve, and clutch mechanism by which power is transmitted from the counter-shaft to either of its gears.

10. The combination with a differential gear of a sleeve integral therewith, a plurality of drivers fixed to and turnable therewith, and means for transmitting motion therethrough at different speeds.

11. The combination with a differential gear through which power is transmitted, of a plurality of drivers of different diameters united and turnable in unison with said gear, a motor and intermediate devices for transmitting motion therefrom through either of said drivers.

12. The combination with a differential gear through which power is transmitted of a plurality of drivers of different diameters united and turnable in unison with said gear, a motor and intermediate devices for transmitting motion therefrom through either of the drivers without disengaging the remaining connections.

13. The combination with a differential gear through which power is transmitted, of drivers of different diameters united and turnable in unison with said gear, a motor and intermediate devices for transmitting motion through either of the drivers, and an idler interposed between one of the drivers and its source of power whereby a reverse pressure or movement may be effected without changing the direction of the motor.

14. A main shaft and a gear carried thereby, drivers of different diameters and a sleeve freely turnable with relation to the shaft and carrying the drivers whereby said drivers are united to and turnable in unison with said gear, a counter-shaft having drivers loosely turnable thereon and in continuous connection with those upon the main shaft, mechanism by which either driver upon the counter-shaft may be independently locked thereto, and a motor from which power is transmitted to the counter-shaft.

15. A shaft and a gear carried thereby, drivers of different diameters and a sleeve freely turnable with relation to the shaft and carrying the drivers whereby said drivers are united to and turnable in unison with said gear, a counter-shaft having loosely-turnable drivers in continuous connection with those upon the main shaft, means for locking either to transmit motion to its fellow, an intermediate idler between one pair of said drivers whereby the movement of the main shaft may be reversed, and a motor from which power is transmitted through the counter-shaft to drive the main shaft in either direction and to act as a brake therefor.

In witness whereof I have hereunto set my hand.

WILLIAM J. WOOSLEY.

Witnesses:
S. H. NOURSE,
JESSIE C. BRODIE.